June 29, 1937.                 E. H. SCHULTZ                 2,085,341
                           TANDEM WHEEL ASSEMBLY
                            Filed Oct. 3, 1936
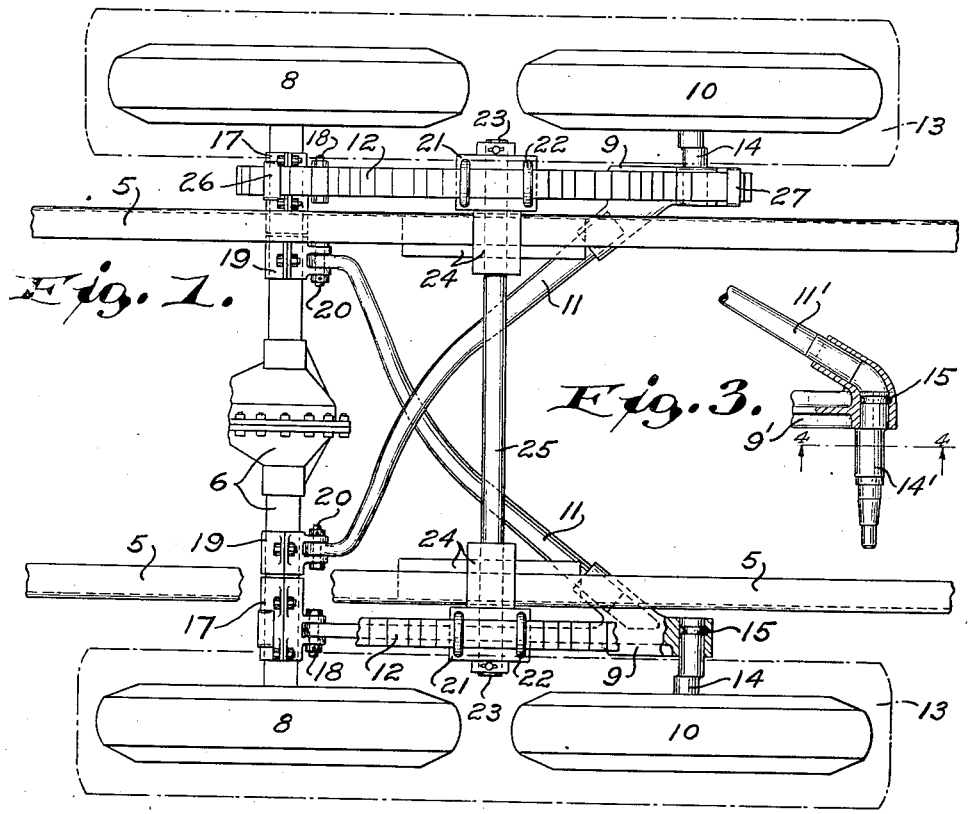
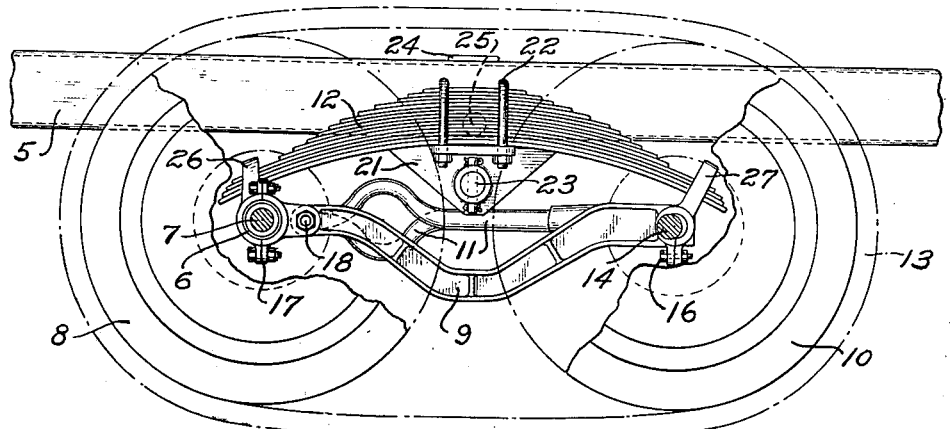
INVENTOR.
E. H. Schultz
BY Morsell, Lieber & Morsell
ATTORNEYS.

Patented June 29, 1937

2,085,341

UNITED STATES PATENT OFFICE 2,085,341

TANDEM WHEEL ASSEMBLY

Edward H. Schultz, Milwaukee, Wis.

Application October 3, 1936, Serial No. 103,870

12 Claims. (Cl. 280—124)

My present invention relates to improvements in the construction and operation of tandem wheel assemblages which are primarily applicable to road vehicles in order to increase the traction.

An object of the present invention is to provide a simple, compact and durable tandem wheel assembly, which is extremely efficient and flexible in use and which can be readily applied to vehicles of various types.

In my prior Patent No. 2,056,371, granted October 6, 1936, I have shown and described a highly efficient tandem wheel attachment for vehicles, wherein a set of tandem wheels comprising a front and a rear wheel connected by a beam is located near each side of the vehicle frame, each beam being pivotally suspended at its forward end upon a common front axle carrying the front wheels, and having its rear swinging end connected by an auxiliary axle with the front axle near the point of pivotal attachment of the other beam thereto. While this prior assembly functions perfectly, its commercial application to various designs of vehicles has presented certain difficulties. Because of the fact that the auxiliary axles which cross each other are offset remote from their pivotal axes so as to permit relative swinging thereof, and are also pivotally connected to swing about the main axle in the planes of the side beams, it is difficult to provide a standardized assemblage wherein the auxiliary axles are not undesirably crooked and which will fit vehicle frames of different widths, thereby necessitating custom building of these prior units for different types of vehicles to which they are applied.

The present invention therefore contemplates the provision of certain improved structural features applicable to such tandem wheel assemblies, which will permit convenient application thereof to vehicles having different frame widths.

Another specific object of my present invention is the provision of an improved assemblage for increasing the traction wherein the wheels of each tandem set are maintained in absolute alinement with each other at all times, with relatively simple mechanism of improved appearance.

Another specific object of the invention is to provide a durable tandem wheel attachment of simple construction which may be readily applied to vehicles having different frame widths, without necessitating reconstruction of the auxiliary axles which stabilize the tandem wheel supports.

A further specific object of the present invention is to provide improved instrumentalities for effecting adjustment of the tandem wheels of each set so as to compensate for variations in the length of endless traction belts associated with the wheels.

Still another specific object of the invention is to provide an improved tandem wheel attachment which may be conveniently applied to or removed from the main axle of a standard vehicle, and which can be manufactured at moderate cost.

An additional specific object of this invention is to provide a new and useful tandem wheel assemblage which is extremely flexible in action and which is especially adapted to operate on abnormally rough road beds.

These and other specific objects and advantages will be apparent from the following detailed description.

A clear conception of an embodiment of the present invention and of the mode of constructing and of operating tandem wheel assemblies built in accordance therewith, may be had by referring to the drawing accompanying and forming a part of this specification in which like reference characters designate the same or similar parts in the several views.

Fig. 1 is a somewhat diagrammatic top view of my present improved tandem wheel attachment showing the same applied to a fragment of a vehicle frame, and also showing in dot-and-dash lines, outlines of endless track mechanisms which may be applied to the wheels;

Fig. 2 is a similarly diagrammatic side view of the improved tandem wheel assembly and vehicle frame shown in Fig. 1, parts having been broken away in order to clarify the disclosure of other parts;

Fig. 3 is a fragmentary top view of a modified form of rear wheel supporting beam and auxiliary axle assemblage; and Fig. 4 is a vertical section through the modified assemblage of Fig. 3, taken along the line 4—4.

While the invention has been illustrated herein as being embodied in a detachable tandem wheel assembly applied to the rear axle and chassis of a relatively light motor driven vehicle, it is not the intent to thereby unnecessarily restrict the scope, since the improved features may obviously be more generally applied to tandem wheel assemblies for other types of vehicles.

Referring to the drawing, the improved tandem wheel assemblage shown therein comprises in general, an ordinary vehicle chassis or frame 5 of suitable construction adapted to directly support the load; a main axle extending across the frame 5 and consisting of a housing 6 and alined half shafts 7 rotatably supported within the housing; front main or drive wheels 8 adapted to be driven by the outwardly projecting ends of the half shafts 7 near the opposite sides of the frame 5; a side member or beam 9 swingably supported upon the housing 6 of the main axle near each side of the frame 5 and adjacent to each of the front wheels 8; an auxiliary or rear wheel 10 rotatably supported by the swinging end of each beam 9 remote from the front axle; a swingable rod or auxiliary axle 11 connecting the swinging portion of each beam 9 with a portion of the main axle at the opposite side of the frame 5; and leaf springs 12 providing resilient direct supports for the opposite sides of the frame 5 and having front and rear ends movably coacting with the corresponding ends of the adjacent frame 9.

The frame 5 is ordinarily provided with a body of the usual type for confining the load and the ends of the rotary half shafts 7 which are disposed within the housing 6, are positively driven from the motor of the vehicle through the usual transmission and differential gearing. The wheels 8, 10 may be of standard construction having the usual removable rubber tires, and may be caused to either directly engage the road bed, or to cooperate with ground engaging flexible endless tracks or tread mechanisms 13 as shown in dot-and-dash lines in Figs. 1 and 2. In some cases, the rear or auxiliary wheels 10 may be positively driven by means of sprocket chain drives connecting the hubs of the complementary wheels of each tandem set, but the use of such positive drives is optional. The auxiliary wheel 10 of each set is rotatably mounted upon a journal portion 14 which may either be formed integral with or attached to the swinging end of the adjacent auxiliary axle 11, and these journal portions 14 may be rigidly attached to the ends of the adjacent beams 9 in any suitable manner as by means of pins 15 and clamping bolts 16. The journal portions 14 are preferably formed eccentric as shown, so that by releasing the clamping bolts 16, and by subsequently turning the journal portions 14, the rear wheels 10 may be moved toward or away from the front wheels 8 so as to compensate for variations in length of the drive chains for the rear wheels (not shown) and of the endless tread mechanisms 13 when used.

While the auxiliary axles 11 may be secured to the swingable ends of the beams 9 in the manner shown in Figs. 1 and 2, this attaching means may be modified as shown in Figs. 3 and 4. In this modification, the swingable beams 9' are formed with integral sockets for receiving the auxiliary axles 11', and which terminate in the openings for receiving the modified journal pins 14'. These journal pins 14' are retained within their receiving holes by pins 15 and may be clamped in any desired angular position by means of clamping bolts 16 in the manner previously described, in order to compensate for variations in length of the rear wheel drive chains or of the endless track mechanisms 13 associated with the wheels 8, 10. As in the case of Figs. 1 and 2, the journal pins 14' likewise have eccentric portions for drive chain tensioning purposes which rotatably support the rear wheels 10.

The wheels 8, 10 of each set are always maintained in the same plane perpendicular to the axes of their supporting axles, and the axes of rotation of the wheels of each tandem set are always retained parallel to each other, regardless of the fact that the two sets of wheels are independently swingable about their common pivotal axis. While the housing 6 for the half shafts 7 is capable of tilting to a limited extent relative to the vehicle frame 5, it is maintained normal with respect to the driving shaft which extends longitudinally of the vehicle, by the usual radius rods, torque arms, or other similar means, not shown.

The side beams 9 are of relatively rigid construction, and the forward end of each of these beams is pivotally but detachably attached to a bracket 17 by means of a pivot pin 18. The brackets 17 are adapted to be clamped to the adjacent front axle housing 6 in a predetermined position, by means of bolts as shown in the drawing, thereby permitting location of the beams 9 in definite locations with respect to the main axle and the vehicle frame 5. The pivoted ends of the auxiliary axles 11 are swingably connected to other brackets 19 by means of pivots 20, and the brackets 19 are likewise adapted to be clamped to the front axle housing 6. The adjacent brackets 17, 19 at the same side of the vehicle may however be formed integral with each other.

When the brackets 17, 19 have been properly applied to the axle housing 6, all of the pivots 18, 20 should preferably be in perfect alinement with each other at all times, and this is especially true of the pivots 18, 20, associated with the complementary beam 9 and auxiliary axle 11. The auxiliary axles 11 cross each other beneath the center of the frame 5, as clearly indicated in Fig. 1, and the point of crossing is preferably located as near as possible to the axis of the front axle, and farther away from the axes of the rear wheels 10. The auxiliary axles 11 are vertically offset or bent at the point of crossing, and by locating the point of crossing near the common axis of the pivots 18, 20, the extent of offsetting or bending required for clearance purposes, will be reduced to a minimum. Since the rear ends of the auxiliary axles 11 are rigidly attached to the swinging end portions of the beams 9, and because these auxiliary axles are pivoted to swing upon the same axes as the complementary beams 9, the wheels 8, 10 of each tandem set will always be maintained in a common plane which is perpendicular to the axis of the front or main axle.

Each of the leaf springs 12 has its medial portion secured to a bracket 21 by means of U-bolts 22 as clearly illustrated in Figs. 1 and 2, and the brackets 21 are pivotally supported upon alined stub shafts 23 secured to the vehicle frame 5 by means of retaining brackets 24. The retaining brackets 24 which are rigidly attached to the side frames 5 are also interconnected by a cross brace or rod 25 which spans the vehicle chassis some distance above the stub shafts 23 and above the auxiliary axles 11. The springs 12 are obviously adapted to oscillate on the stub shafts 23, and the front and rear ends of these springs coact with the front and rear ends of the adjacent side beams 9. Loops 26, 27 surround the front and rear ends respectively of the springs 12 and prevents the spring ends from becoming dislocated with reference to the ends of the beams 9, while permitting these spring ends to disengage the adjacent ends of the beams during certain conditions of operation.

When the improved tandem wheel assembly has been properly applied to a vehicle frame 5, and the motor of the vehicle is operating, the front driving wheels 8 may be set in motion to transport the vehicle over the ground, in a well known manner. The rear wheels 10 will then be rotated by contact with the ground, or with an endless track mechanism 13, if the latter is used. If either of the front wheels 8 engages an obstruction, the obstructed wheel will be elevated thereby causing tilting of the axle housing 6 relative to the frame 5, and such relative movement is permitted by the adjacent spring 12. During elevation of the obstructed wheel 8 away from the ground, and before the complementary auxiliary wheel 10 has engaged the obstruction, the adjacent beam 9 and its cooperating auxiliary axle will swing downwardly upon the pivots 18, 20, but upwardly relative to the ground surface, thereby causing the cooperating spring 12 to swing on its stub shaft 23 so that the adjacent portion of the frame 5 will move upwardly approximately one-half of the total displacement of the obstructed front wheel 8. Although the front wheel 8 may be elevated while the corresponding rear wheel 10 of the same set is not necessarily lifted away from the ground, these wheels will always remain in the same plane and will rotate about parallel axes. When the driving wheel 8 passes the obstruction and the corresponding trailer wheel 10 encounters the same obstruction by virtue of continued advancement of the vehicle, the front wheel 8 will descend while the rear wheel 10 will rise, thereby causing the interconnecting beam 9 and the auxiliary axle 11 to swing upwardly about the pivots 18, 20, and simultaneously causing the corresponding spring 12 to rock in the opposite direction about its stub shaft 23. During such reverse swinging of the tandem wheel set, the spring 12 again cooperates with the beam 9 to minimize the motion of the vehicle frame 5, and it is to be noted that since the vehicle frame is supported midway between the ends of the beams 9 and coacts therewith through flexible springs 12, only very large obstructions will have a noticeable effect upon the position of the frame 5. When both wheels 8, 10 move parallel up or down, the springs 12 do not move laterally but merely slide longitudinally of the beams 9, and no lateral tilting of the vehicle frame 5 results.

While it is unnecessary to provide for relative adjustment of the wheels 8, 10, when no endless track mechanism 13 is being utilized, such relative adjustment of the wheels becomes desirable when using an endless track mechanism, in order to compensate for stretching of the drive chains. Such relative adjustment of the wheels 8, 10 may be readily effected with the eccentric journal pins 14, 14' shown in all of the figures of the drawing. The adjustment may be quickly effected by merely releasing the clamping bolts 16 and turning the journal pins, and the retaining pins 15 prevent longitudinal shifting of the journal pins during such adjustment. After proper adjustment has been effected, the clamping bolts 16 may again be tightened to firmly retain the journal pins in adjusted position.

From the foregoing description it will be noted that the present invention provide a tandem wheel assembly which may be readily applied to vehicles having frames 5 of different widths. The brackets 17, 19 permit disposition of the pivots 18, 20 at any desired position along the front axle housing 6, and also permit perfect alinement of the pivots 18, 20. The same auxiliary axles 11 may be employed regardless of the width of the vehicle frame 5, and the same brackets 17, 19 may also be utilized. The location of the crossings for the auxiliary axles 11 near the common axis of the pivots 18, 20, permits minimum offsetting of the auxiliary axles at the crossing point, thereby presenting a neater appearance and avoiding possible interference with other mechanism associated with the vehicle chassis. The improved assemblage is not only extremely simple in construction, but is also durable and can be manufactured and applied at moderate cost. The assemblage will permit propulsion of the vehicle over extremely rough and irregular surfaces, and by locating the pivots 18, 20 rearwardly of the axis of the main or front axle, the mounting and adjustment of the tandem wheel supporting frames is greatly facilitated. While this location of the pivots 18, 20 will tend to slightly move the axis of the front and rear wheels 8, 10 respectively toward each other during extreme displacement of either of these wheels, this action is not objectionable even when an endless track mechanism 13 is being utilized, since the maximum motion caused thereby is very slight. The improved assemblage has proven highly practical for application to light motor driven trucks, but the invention is obviously applicable to other types of trucks and to trucks having frames of different widths, without material modification in the construction.

It should be understood that it is not desired to limit the invention to the exact details of construction and to the precise mode of operation herein shown and described, for various modifications within the scope of the claims may occur to persons skilled in the art.

I claim:—

1. In a vehicle, a vehicle frame, a main axle extending across said frame, a main wheel carried by said axle near each side of said frame, a beam swingable about an axis closely adjacent each of said main wheels, an auxiliary wheel rotatably supported at the swingable end of each of said beams, and an auxiliary axle connecting the swingable end of each beam with said main axle near the opposite side of said frame, said beams and auxiliary axles being swingable about a common axis offset with respect to the main axle axis.

2. In a vehicle, a vehicle frame, a main axle extending across said frame, a front wheel carried by said axle near each side of said frame, a rearwardly extending beam swingable about an axis closely adjacent each of said front wheels, a rear wheel rotatably supported at the rear swingable end of each of said beams, and an auxiliary axle connecting the rear swingable end of each beam with said main axle near the opposite side of said frame, said beams and auxiliary axles being swingable about a common axis parallel to but offset rearwardly with respect to the main axle axis.

3. In a vehicle, a vehicle frame, a main axle extending across said frame, a main wheel carried by said axle near each side of said frame, a beam swingable about an axis closely adjacent each of said main wheels, an auxiliary wheel rotatably supported at the swingable end of each of said beams, and an auxiliary axle connecting the swingable end of each beam with said main axle near the opposite side of said frame, said auxiliary axles extending diagonally across said frame to cross each other and being vertically offset at their crossing point which is located near their pivoted ends and farther away from the swingable ends thereof.

4. In a vehicle, a vehicle frame, a main axle extending across said frame, a front wheel carried by said axle near each side of said frame, a rearwardly extending beam swingable about an axis closely adjacent each of said front wheels, a rear wheel rotatably supported at the rear swingable end of each of said beams, and an auxiliary axle connecting the rear swingable end of each beam with said main axle near the opposite side of said frame, said auxiliary axles crossing each other beneath said frame and being vertically offset at the crossing point which is disposed near the axis of said front wheels and farther away from the axes of said rear wheels.

5. In a vehicle, a vehicle frame, a main axle extending across said frame, a main wheel carried by said axle near each side of said frame, a beam swingable about an axis closely adjacent each of said main wheels, an auxiliary wheel rotatably supported at the swingable end of each of said beams, an auxiliary axle connecting the swingable end of each beam with said main axle near the opposite side of said frame, said beams and auxiliary axles being swingable about a common axis offset with respect to the main axle axis, and means for resiliently supporting said vehicle frame upon said beams.

6. In a vehicle, a vehicle frame, a main axle extending across said frame, a front wheel carried by said axle near each side of said frame, a rearwardly extending beam swingable about an axis closely adjacent each of said front wheels, a rear wheel rotatably supported at the rear swingable end of each of said beams, an auxiliary axle connecting the rear swingable end of each beam with said main axle near the opposite side of said frame, said beams and auxiliary axles being swingable about a common axis parallel to but offset rearwardly with respect to the main axle axis, and springs for resiliently supporting said vehicle frame upon the end portions and above the medial portions of said beams.

7. In a vehicle, a vehicle frame, a main axle extending across said frame, a main wheel carried by each end of said axle near each side of said frame, a beam swingably attachable to said axle in a predetermined position near each of said wheels, an independently positionable pivot bracket for swingably supporting each beam, an auxiliary wheel rotatably supported at the swingable end of each of said beams, and an auxiliary axle connecting the swingable end of each beam with said main axle near the opposite side of said frame.

8. In a vehicle, a vehicle frame, a main axle extending across said frame, a main wheel carried by said axle near each side of said frame, a beam swingable about an axis closely adjacent each of said main wheels, an auxiliary wheel rotatably supported at the swingable end of said beams, an auxiliary axle connected at one end to the swingable end of each beam, and means adjustably positionable along the main axle axis for pivotally connecting the opposite end of each auxiliary axle to said main axle.

9. In a vehicle, a vehicle frame, a main axle extending across said frame, a front wheel carried by each end of said axle near each side of said frame, a rearwardly extending beam swingable about an axis closely adjacent each of said front wheels, a rear wheel rotatable at the swingable rear end of each of said beams, an auxiliary axle pivotally connecting the swingable end of each beam with said main axle near the opposite side of said frame so as to cause said auxiliary axles to swing about axes concentric with said beam axes, and means for effecting independently adjustable attachment of the pivots of said beams and of said auxiliary axles along said main axle.

10. In a vehicle, a vehicle frame, a main axle extending across said frame, a main wheel carried by said axle near each side of said frame, a beam swingable about an axis closely adjacent each of said main wheels, an auxiliary wheel rotatably supported at the swingable end of each of said beams, means for varying the distance between the axes of said main and auxiliary wheels, and an auxiliary axle connecting the swingable end of each beam with said main axle near the opposite side of said frame, said beams and auxiliary axles being swingable about a common axis offset with respect to the main axle axis.

11. In a vehicle, a vehicle frame, a main axle extending across said frame, a main wheel carried by said axle near each side of said frame, a beam swingable about an axis closely adjacent each of said main wheels, an auxiliary wheel rotatably supported at the swingable end of said beams, means for varying the distance between the axes of said main and auxiliary wheels, an auxiliary axle connected at one end to the swingable end of each beam, and means adjustably positionable along the main axle axis for pivotally connecting the opposite end of each auxiliary axle to said main axle.

12. In a vehicle, a vehicle frame, a main axle extending across said frame, a main wheel carried by said axle near each side of said frame, a beam swingable about an axis closely adjacent each main wheel, an auxiliary wheel carried by the swinging end of each of said beams, each of said auxiliary wheels being rotatable in the plane of rotation of the corresponding main wheel, means for adjusting the axis of rotation of each of said auxiliary wheels toward and away from the axis of said main axle, and an auxiliary axle connecting the swingable end of each beam with said main axle near the opposite side of said frame, said beams and auxiliary axles being swingable about a common axis offset with respect to the main axle axis.

EDWARD H. SCHULTZ.